(12) United States Patent
Takamatsu

(10) Patent No.: US 8,321,418 B2
(45) Date of Patent: Nov. 27, 2012

(54) INFORMATION PROCESSOR, METHOD OF PROCESSING INFORMATION, AND PROGRAM

(75) Inventor: Shingo Takamatsu, Tokyo (JP)

(73) Assignee: Sony Corporation (JP)

( * ) Notice: Subject to any disclaimer, the term of this patent is extended or adjusted under 35 U.S.C. 154(b) by 36 days.

(21) Appl. No.: 12/930,665

(22) Filed: Jan. 13, 2011

(65) Prior Publication Data

US 2011/0179034 A1    Jul. 21, 2011

(30) Foreign Application Priority Data

Jan. 20, 2010    (JP) ............................... P2010-009738

(51) Int. Cl.
*G06F 17/30*    (2006.01)
(52) U.S. Cl. ...................................................... 707/738
(58) Field of Classification Search ................... 707/738
See application file for complete search history.

(56) References Cited

U.S. PATENT DOCUMENTS

2011/0035345 A1* 2/2011 Duan et al. ..................... 706/12

OTHER PUBLICATIONS

"Discovering Relations among Named Entities from Large Corpora," Hasegawa et al., Proceedings of the Conference of the Association for Computational Linguistics 2004, pp. 415-422.

* cited by examiner

*Primary Examiner* — Sheree Brown
(74) *Attorney, Agent, or Firm* — Lerner, David, Littenberg, Krumholz & Mentlik, LLP

(57) ABSTRACT

An information processor carrying out statistical natural language processing for a document, the information processor includes a characteristic amount extraction unit configured to detect context information including a proper noun pair from the document and extract a characteristic amount of the detected context information; a characteristic amount analysis unit configured to, by analyzing the characteristic amount of the extracted context information using a probability model in which a document topic meaning an entire topic of the document and a context topic meaning a local topic of the document are considered, estimate a potential variable and a context topic ratio in the probability model; and a clustering unit configured to cluster the proper noun pair included in the context information based on the context topic ratio estimated regarding the characteristic amount of the respective context information.

8 Claims, 9 Drawing Sheets

FIG. 1A

DOCUMENT D1

Born in Saint Joseph, Missouri, but raised in Detroit, Eminem quickly gained popularity in 1999 with the major-label debut album The Slim Shady LP. ···Hip-hop magazine The Source (magazine) featured Eminem in its "Unsigned Hype" column in March 1998. ···Another song, Guilty Conscience, ends with Eminem's encouraging a man to murder Eminem's wife and her lover"···

FIG. 1B

DOCUMENT D2

Paul McCartney was born in Walton Hospital in Liverpool, England, where his mother, Mary(née Mahon), has worked as a nurse in the maternity ward. ···He gained worldwide fame as a member of The Beatles, with John Lennon, George Harrison, and Ringo Starr. ···He was backed on this performance by Bob Geldof, Pete Townshend, George Michael, and Alison Moyet.···

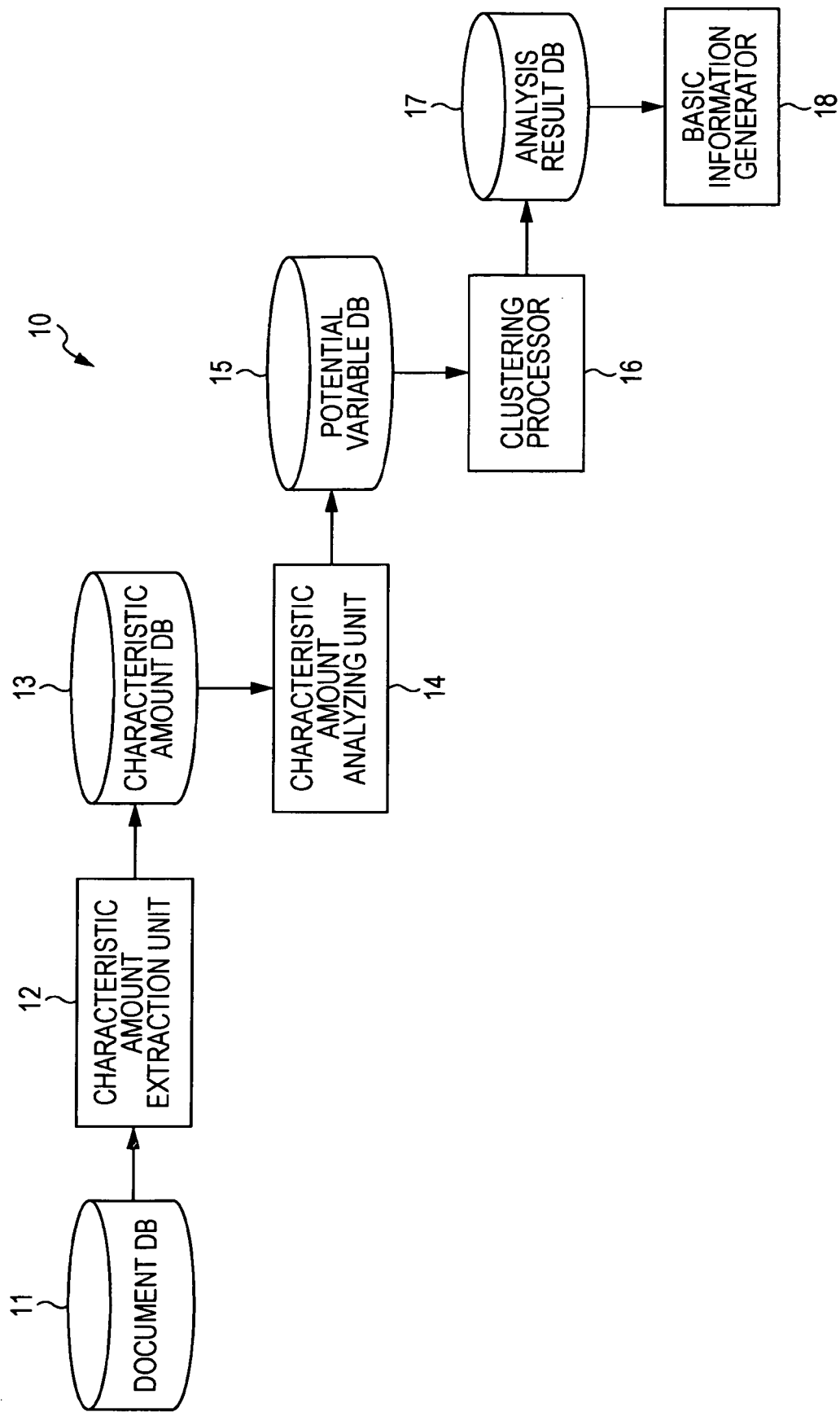

FIG. 4

| DOCUMENT D1 | |
|---|---|
| CHARACTERISTIC AMOUNT D1-1 (SaintJoseph, Eminem) | born, missouri, rais, detroit, quick, gain, popular, 1999,major-label, debut, album, slim, shady, lp |
| CHARACTERISTIC AMOUNT D1-2 (The Source, Eminem) | hip-hop, magazin, magazin, featur, unsign, hype, column, march, 1998 |
| ... | |

| DOCUMENT D2 | |
|---|---|
| CHARACTERISTIC AMOUNT D2-1 (Paul, Liverpool) | born, walton, hospital, england, wher, mother, mary, had, work, nurs, maternity, ward |
| CHARACTERISTIC AMOUNT D2-2 (Paul, Ringo Starr) | gain, worldwid, fam, member, beatl, john, lennon, georg, harrison |
| ... | |

| Eminem | |
|---|---|
| born | Saint Joseph |
| song | Guilty Conscience |
| magazine | The Source |
| ... | ... |

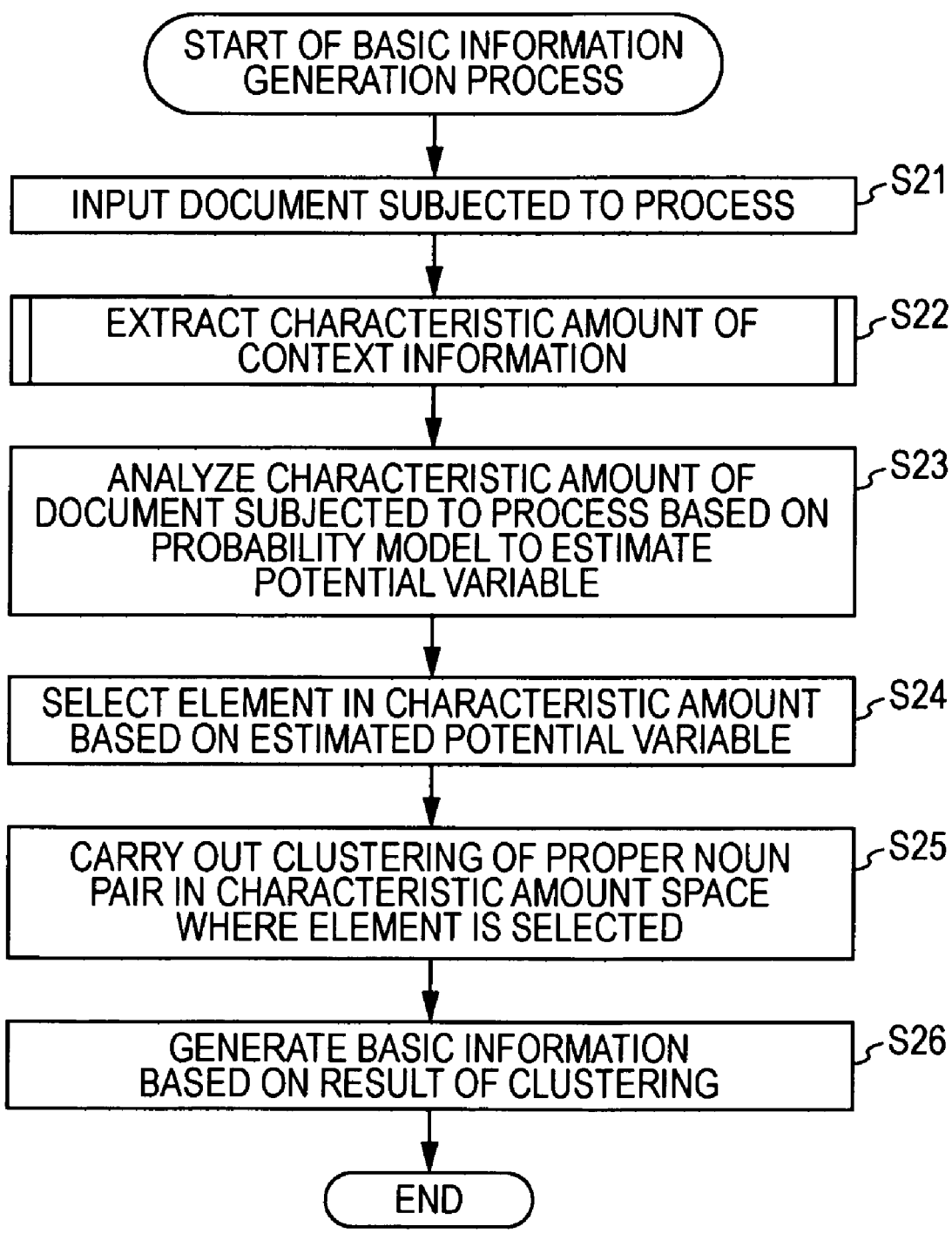

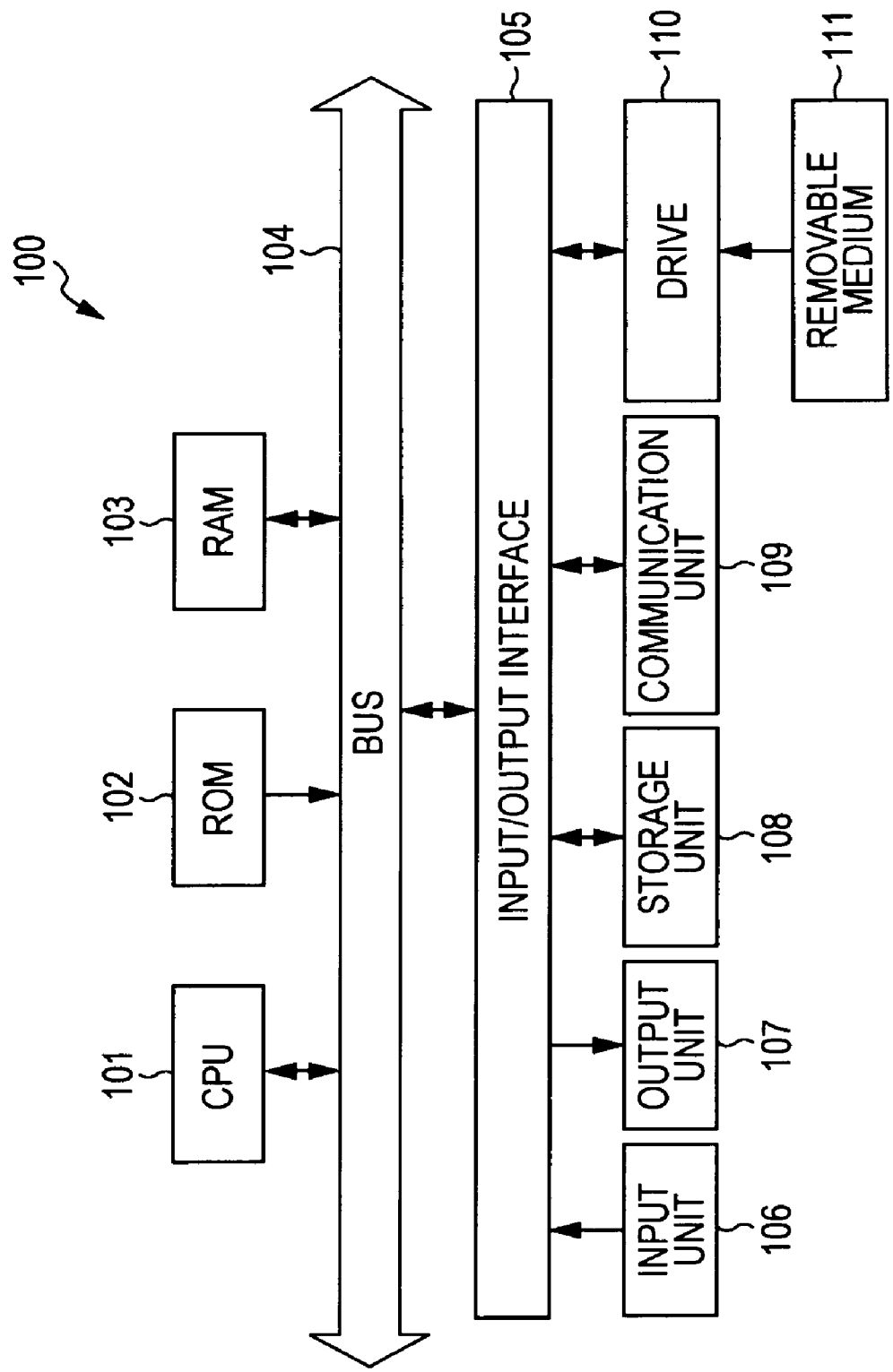

INFORMATION PROCESSOR, METHOD OF PROCESSING INFORMATION, AND PROGRAM

CROSS-REFERENCE TO RELATED APPLICATION

The present application claims priority from Japanese Patent Application No. JP 2010-009738 filed in the Japanese Patent Office on Jan. 20, 2010, the entire content of which is incorporated herein by reference.

BACKGROUND OF THE INVENTION

1. Field of the Invention

The present invention relates to an information processor, a method of processing information, and a program, and particularly to an information processor, a method of processing information, and a program that are used preferably in a case of carrying out statistical natural language processing, such as a synonym analysis, a polysemic analysis, a relevance analysis between two nouns, and a modality analysis of a word, based on context information (for example, a proper noun and a predetermined number of word groups existing before and after that) in a document.

2. Description of the Related Art

In the past, attempts to acquire knowledge are widely carried out by statistically analyzing (carrying out statistical natural language processing) a large amount of documents. For example, in a specialized field where a thesaurus is not developed, automatic creation of a thesaurus in that field and the like are carried out by carrying out statistical natural language processing to documents in the specialized field. Knowledge acquired in such a manner can be utilized for, for example, an application program for information retrieval and the like.

In statistical natural language processing, a characteristic amount of context information (meaning a word group containing a focus word in a document and a predetermined number of words existing before and after that) is utilized frequently. Then, by calculating similarity of the characteristic amount of the context information, the focus word is subjected to a synonym analysis, a polysemic analysis, a relevance analysis between two nouns, a modality analysis of the word, and the like. For example, in "Discovering Relations among Named Entities from Large Corpora", by Takaaki Hasegawa, Satoshi Sekine and Ralph Grishman, In Proceedings of the Conference of the Association for Computational Linguistics 2004, a characteristic amount of context information is utilized for a synonymy analysis of relevance of proper nouns.

SUMMARY OF THE INVENTION

Statistical natural language processing in the past utilizing context information is based on an assumption, "neighboring words relate to each other". However, this assumption does not apply in all cases. That is, while each word that configures context information is relevant to a topic (theme) regarding the entire document including the context information, it may not be directly relevant to the topic regarding the context information. In a case that such context information is subjected to statistical natural language processing in the past, it turns out to cause an error in an analysis result.

Accordingly, statistical natural language processing utilizing context information should be established that, even while based on the assumption, "neighboring words relate to each other", also considers a possibility that the assumption does not hold.

It is desirable to enable to establish statistical natural language processing utilizing context information that, even while based on an assumption, "neighboring words relate to each other", also considers a possibility that the assumption does not hold.

An embodiment of the present invention is an information processor carrying out statistical natural language processing for a document, the information processor including: characteristic amount extraction means for detecting context information including a proper noun pair from the document and extracting a characteristic amount of the detected context information; characteristic amount analysis means for, by analyzing the characteristic amount of the extracted context information using a probability model in which a document topic meaning an entire topic of the document and a context topic meaning a local topic of the document are considered, estimating a potential variable and a context topic ratio in the probability model; and clustering means for clustering the proper noun pair included in the context information based on the context topic ratio estimated regarding the characteristic amount of the respective context information.

Another embodiment of the present invention is the information processor that can further include basic information generation means for generating basic information corresponding to the context information based on a result of clustering the proper noun pair included in the context information.

Still another embodiment of the present invention is the information processor that can further include selection means for selecting an element in the characteristic amount based on the context topic ratio estimated regarding the characteristic amount of the respective context information.

The characteristic amount analysis means can further estimate a mixing ratio of the document topic and the context topic by analyzing the characteristic amount of the extracted context information using the probability model.

The characteristic amount extraction means can include: detection means for detecting a proper noun in the document; anaphora analysis means for carrying out an anaphora analysis for the document; extraction means for setting the proper noun pair in the anaphora analyzed document and extracting the context information containing a plurality of words before and after the proper noun pair including the proper noun pair; and setting means for setting only a word that is registered in a vocabulary dictionary prepared in advance left from the extracted context information as the characteristic amount of the context information.

The statistical natural language processing can be a synonym analysis, a polysemic analysis, a relevance analysis between two nouns, or a modality analysis of a word.

Yet another embodiment of the present invention is a method of processing information of an information processor carrying out statistical natural language processing for a document that includes characteristic amount extraction means for detecting context information including a proper noun pair from the document and extracting a characteristic amount of the detected context information, characteristic amount analysis means for, by analyzing the characteristic amount of the extracted context information using a probability model in which a document topic meaning an entire topic of the document and a context topic meaning a local topic of the document are considered, estimating a potential variable and a context topic ratio in the probability model, and clustering means for clustering the proper noun pair included in the context information based on the context topic ratio estimated regarding the characteristic amount of the respective context information, the method including: a first characteristic amount extracting step of detecting context information including a proper noun pair from a document for learning and extracting a characteristic amount of the detected context information by the characteristic amount extraction means; a first characteristic amount analyzing step of, by analyzing the characteristic amount of the context information extracted from the document for learning using the probability model, estimating the potential variable in the probability model by the characteristic amount analysis means; a second characteristic amount extracting step of detecting context information including a proper noun pair from a document for analysis and extracting a characteristic amount of the detected context information by the characteristic amount extraction means; a second characteristic amount analyzing step of, by analyzing the characteristic amount of the context information extracted from the document for analysis using the probability model, estimating the context topic ratio in the probability model by the characteristic amount analysis means; and a clustering step of clustering the proper noun pair included in the context information based on the context topic ratio estimated regarding the characteristic amount of the respective context information by the clustering means.

Yet another embodiment of the present invention is a program making a computer carrying out statistical natural language processing for a document to work with functions, including: characteristic amount extraction means for detecting context information including a proper noun pair from the document and extracting a characteristic amount of the detected context information; characteristic amount analysis means for, by analyzing the characteristic amount of the extracted context information using a probability model in which a document topic meaning an entire topic of the document and a context topic meaning a local topic of the document are considered, estimating a potential variable and a context topic ratio in the probability model; and clustering means for clustering the proper noun pair included in the context information based on the context topic ratio estimated regarding the characteristic amount of the respective context information.

In an embodiment of the present invention, context information including a proper noun pair is detected from a document, and a characteristic amount of the detected context information is extracted. By analyzing the extracted characteristic amount of the context information using a probability model in which a document topic meaning an entire topic of the document and a context topic meaning a local topic of the document are considered, a potential variable and a context topic ratio in the probability model are estimated. Further, based on the context topic ratio estimated regarding the characteristic amount of the respective context information, the proper noun pair included in the context information is clustered.

According to an embodiment of the present invention, statistical natural language processing utilizing context information can be established that, even while based on an assumption, "neighboring words relate to each other", also considers a possibility that the assumption collapses.

BRIEF DESCRIPTION OF THE DRAWINGS

FIGS. 1A and 1B illustrate examples of a document in English subjected to processing;

FIG. 2 is a block diagram showing a configuration example of a document analyzer to which an embodiment of the present invention is applied;

FIG. 4 illustrates an example of context information and a characteristic amount corresponding to it;

FIG. 9 is a flowchart explaining a second basic information generation process; and FIG. 10 is a block diagram illustrating a configuration example of a computer.

DESCRIPTION OF THE PREFERRED EMBODIMENTS

Figure 3:
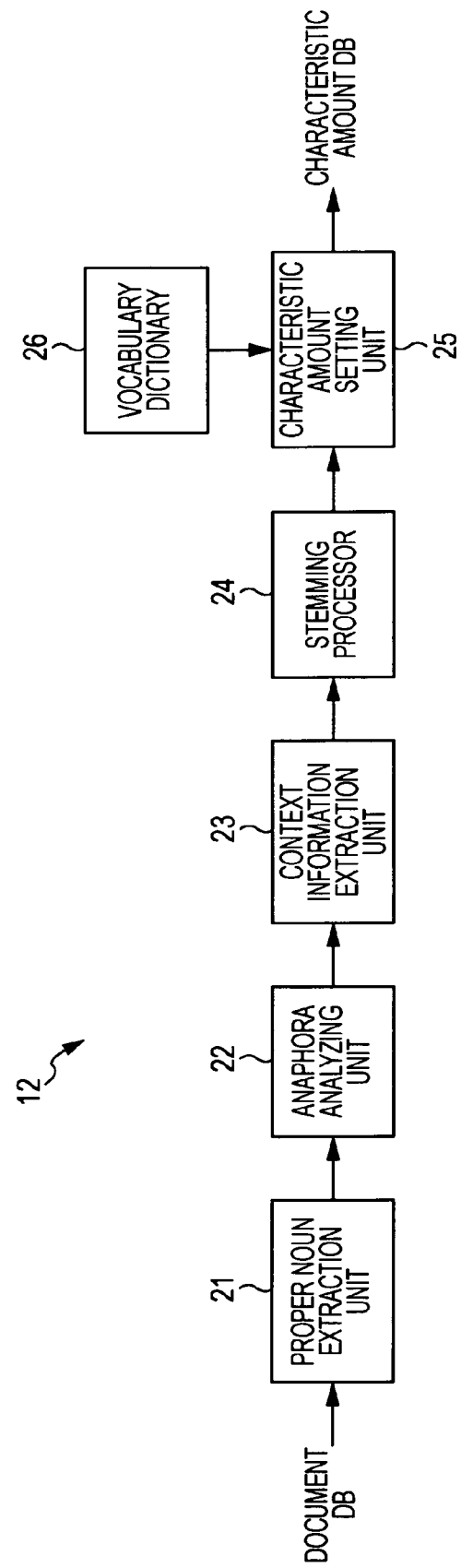
FIG. 3 is a block diagram showing a configuration example of a characteristic extraction unit in FIG. 2.

A detailed description is given below to a preferred embodiment (hereinafter, referred to as an embodiment) of the present invention with reference to the drawings.

1. Embodiment

Outline of Present Embodiment

The present embodiment is a document analyzer for documents in English that clusters a proper noun pair in accordance with the relevance by statistical natural language processing utilizing context information including proper nouns. Further, it extracts basic information (information equivalent to an info box of Wikipedia, an encyclopedia site, published on the Internet) from the document based on the result of clustering.

FIGS. 1A and 1B show two examples of a document in English (hereinafter, simply referred to as a document) subjected to a process by the document analyzer. The documents are composed of a plurality of sentences, and words that configures the sentences are generated in accordance with a topic corresponding to the entire document (hereinafter, referred to as a document topic) and a topic corresponding to each sentence (hereinafter, referred to as a context topic). The two examples in FIGS. 1A and 1B are excerpted from Wikipedia, the encyclopedia site described above.

In a document D1 of FIG. 1A, information regarding Eminem, a musical artist belonging to a category of hip-hop, is described such as his hometown and the costars. In this case, "rap" or the like is assumed as the topic of the entire document D1, and "background", "costarring", or the like is assumed as the topic of each sentence.

In a document D2 of FIG. 1B, information regarding Paul McCartney, a musical artist belonging to a category of rock, is described such as his hometown and the costars. In this case, "rock" or the like is assumed as the topic of the entire document D2, and "background", "costarring", or the like is assumed as the topic of each sentence.

Since the document analyzer focuses on the relevance of proper noun pairs existing in each document, information specialized in the topics of the entire documents, "rap" and "rock", are not desired in all cases. With that, information relevant to the topic of the entire document is removed, and information relevant to the topic of each sentence is also focused to enable to cluster them in a same cluster.

Specifically, a proper noun pair (Saint Joseph, Eminem) extracted from the document in FIG. 1A and a proper noun pair (Paul McCartney, Liverpool) extracted from the document in FIG. 1B are clustered in the same cluster.

[Configuration Example of Document Analyzer]

FIG. 2 shows a configuration example of the document analyzer. This document analyzer 10 is configured with a document DB (database) 11, a characteristic amount extraction unit 12, a characteristic amount DB 13, a characteristic amount analyzing unit 14, a potential variable DB 15, a clustering processor 16, an analysis result DB 17, and a basic information generator 18.

The document DB 11 retains a large amount of documents as shown in FIGS. 1A and 1B for learning. The document DB 11 also retains documents as shown in FIGS. 1A and 1B as an object for analysis processing. The characteristic amount extraction unit 12 detects context information (details are described later) including two proper nouns (proper noun pair) from the document obtained from the document DB 11, and extracts a characteristic amount of the respective context information thus detected to output to the characteristic amount DB 13. The characteristic amount DB 13 retains a characteristic amount corresponding to the respective context information detected from each document.

The characteristic amount analyzing unit 14 assumes that each document is created using a probability model described later, and analyzes a characteristic amount corresponding to the respective context information detected from each document using the probability model to output a potential variable obtained as a result thereof to the potential variable DB 15. The potential variable DB 15 retains a potential variable corresponding to the respective context information detected from each document.

The clustering processor 16 carries out clustering of a proper noun pair included in the respective context information of the document subjected to the analysis based on the potential variable corresponding to the respective context information obtained by learning to output the result of clustering to the analysis result DB 17. This clustering clusters proper noun pairs, having relationship expressed by different words even though in similar meanings, in a same cluster. Specifically, for example, a proper noun pair (Saint Joseph, Eminem) expressed as "born in Saint Joseph, Eminem" and a proper noun pair (Paul McCartney, Liverpool) expressed as "Paul McCartney was born in Liverpool" are clustered in a same cluster. The analysis result DB 17 retains the result of clustering the proper noun pair.

The basic information generator 18 generates basic information based on the result of clustering retained in the analysis result DB 17.

[Description of Characteristic Amount Extraction Unit 12]

FIG. 3 shows a detailed configuration example of the characteristic amount extraction unit 12 in FIG. 2. The characteristic amount extraction unit 12 is configured with a proper noun extraction unit 21, an anaphora analyzing unit 22, a context information extraction unit 23, a stemming processor 24, a characteristic amount setting unit 25, and a vocabulary dictionary 26.

The proper noun extraction unit 21 detects proper nouns from a document subjected to the process. The anaphora analyzing unit 22 carries out anaphora analysis processing in which anaphoras, such as a pronoun and a demonstrative, are detected from the document subjected to the process and nouns corresponding to them are specified, and those corresponding to proper nouns out of the detected anaphoras are substituted with the proper nouns.

The context information extraction unit 23 detects a sentence including two or more words of proper nouns (including those substituted from an anaphora) from the document subjected to the process, and sets a proper noun pair in the detected sentence, and then extracts words between the proper noun pair and a predetermined number of words before and after them as the context information. Accordingly, at least two words of proper nouns (proper noun pair) are included in the context information.

The stemming processor 24 carries out a stemming process in which a stem of each word is extracted that configures the respective context information extracted from the document subjected to the process.

The characteristic amount setting unit 25 leaves only the words registered in the vocabulary dictionary 26 (words after the stemming process) out of the words after stemming process that configure the context information to remove the words not registered in the vocabulary dictionary 26. Then, the characteristic amount setting unit 25 sets a word group unremoved and left in the context information as a characteristic amount of the context information. The words after the stemming process included in the characteristic amount are referred to as elements of the characteristic amount.

In the vocabulary dictionary 26, words having high TF-IDF (term frequency-inverse document frequency) scores are registered in advance in a state after the stemming process. On the contrary, in the vocabulary dictionary 26, stop words for retrieval (such as the, is, and of), words having low TF-IDF scores, predetermined symbols, and the like are not registered.

The context information may also include, in addition to the words after the stemming process described above, syntax analysis information, such as the parts of speech of the words before the stemming process, attribution information of each word, and dependency of each word.

FIG. 4 shows a state of context information (proper noun pairs included therein) extracted from the documents D1 and D2 shown in FIGS. 1A and 1B and the characteristic amounts corresponding to them being retained in the characteristic amount DB 13. As shown in FIG. 4, in the characteristic amount DB 13, each document is associated with the respective context information extracted therefrom, and further, the respective context information is associated with the characteristic amount.

For example, the context information including the proper nouns (Saint Joseph, Eminem) extracted from the document D1 is associated with "born, missouri, rais, detroit, quick, . . . " as a characteristic amount D1-1 thereof. The context information including the proper nouns (The Source, Eminem) is associated with "hip-hop, magazin, magazin, featur, unsign, hype, . . . " as a characteristic amount D1-2 thereof.

Similarly, for example, the context information including the proper nouns (Paul, Liverpool) extracted from the document D2 is associated with "born, walton, hospital, england, wher, . . . " as a characteristic amount D2-1 thereof. The context information including the proper nouns (Paul, Ringo Starr) is associated with "gain, worldwid, fam, member, beatl, john, . . . " as a characteristic amount D2-2 thereof.

[Description of Probability Model Assumed in Characteristic Amount Analyzing Unit 14]

A document processed by the document analyzer 10 (documents for learning and documents subjected to an analysis) is composed of a plurality of sentences, and words that configure a sentence is assumed to be generated in accordance with a topic corresponding to the entire document (hereinafter, referred to as a document topic) and a topic corresponding to each sentence (hereinafter, referred to as a context topic).

Figures 5, 6:
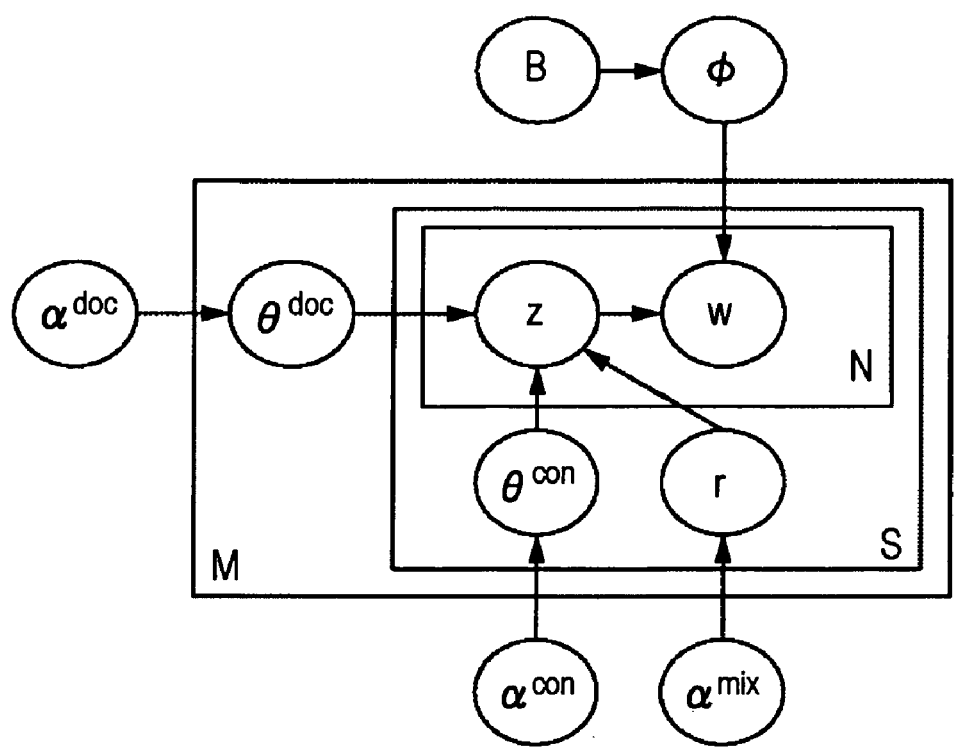
FIG. 5 illustrates a probability model assumed for a process of document creation.
FIG. 6 illustrates one example of basic information.

FIG. 5 shows a probability model (graphical model) corresponding to such an assumption. In FIG. 5, M denotes a number of documents, S denotes a number of sentences in each document, and N denotes a number of elements in the characteristic amount of each sentence. The superscript doc indicates to be relevant to a document, and the superscript con indicates to be relevant to a context.

In this probability model, a document topic and a context topic are expressed as a multinomial distribution in a predetermined dictionary word. A document has a document topic, and each sentence has a different context topic respectively.

The process of generating a sentence is as follows. That is, a number of documents is set to M, a number of sentences in each document to S, a number of elements in a characteristic amount of each sentence to N, and a number of document topics and a number of context topics are set to values of from 10 to 100. Elements in a characteristic amount are generated in the following generation process. Each element in a characteristic amount is ordered.

For all documents, (1) word generation probability regarding each topic is generated from a Dirichlet distribution $p(\theta|\beta)$.

For each document, (2) topic generation probability of the document is generated from a Dirichlet distribution $p(\theta doc|\alpha doc)$.

For each context, (3) a topic ratio of the context is generated from a Dirichlet distribution $p(\theta con|\alpha con)$, and (4) a mixing ratio between document topics and context topics is generated from a Dirichlet distribution $p(r|\alpha mix)$.

For each element in a characteristic amount, (5) whether a document topic or a context topic is selected based on the topic mixing ratio between the document topics and the context topics, (6) a topic is selected from the topic ratio corresponding to the selected topic (here, which topic is selected is expressed by a potential variable z, and a distribution representing a generation process of z expressed during the generation processes of (5) and (6) is expressed as $p(z|\theta doc, \theta con, r)$), and (7) an element w in the characteristic amount is generated from a multinomial distribution $p(w|\phi, z)$ in accordance with the selected topic.

The above generation process can be represented by an expression (1) that follows.

$$p(w,z,r,\theta doc,\theta con,\pi,\phi|\alpha doc,\alpha con,\alpha mix,\beta) = p(w/z,\phi)p(z\theta doc,\theta con,r)p(r|\pi)p(\theta doc|\alpha doc)p(\theta con|\alpha con)p(\pi|\alpha mix)p(\phi|\beta) \quad (1)$$

In the characteristic amount analyzing unit 14, a corresponding potential variable is estimated by statistically analyzing a characteristic amount of the respective context information that is assumed to be generated through the processes described above.

Specifically, the potential variable is estimated by Gibbs sampling as shown in an expression (2) that follows.

$$p(z_{ijk} = t, r_{ijk} = r \mid w_{ijk} = v, \ldots) \propto \quad (2)$$

-continued $$\begin{cases} \dfrac{c(\cdot,\cdot,t,v)+\beta}{c(\cdot,\cdot,t,\cdot)+V\beta} \cdot \dfrac{c(i,\cdot,t,\cdot)+\alpha^{doc}}{c(i,\cdot,\cdot,\cdot)+T^{doc}\alpha^{doc}} \cdot \dfrac{c(i,j,doc,\cdot)+\alpha^{mix}}{c(i,j,\cdot,\cdot)+2\alpha^{mix}} \\ \quad \text{if } r_{ijc} = doc \\ \dfrac{c(\cdot,\cdot,t,v)+\beta}{c(\cdot,\cdot,t,\cdot)+V\beta} \cdot \dfrac{c(i,j,t,\cdot)+\alpha^{con}}{c(i,j,\cdot,\cdot)+T^{con}\alpha^{con}} \cdot \dfrac{c(i,j,loc,\cdot)+\alpha^{mix}}{c(i,j,\cdot,\cdot)+2\alpha^{mix}} \\ \quad \text{if } r_{ijt} = con \end{cases}$$

Here, $c(i, j, t, v)$ is a number of topics t and vocabulary items v generated in a j-th sentence in an i-th document. "·" indicates to take a sum for the element. con indicates marginalization related to the context topics. doc indicates marginalization related to the document topics. A subscript ijk shows a k-th characteristic amount element of the j-th sentence in the i-th document. rijk shows which is selected out of a document topic and a context topic when the element in the characteristic amount is generated. Tdoc represents a number of document topics. Tcon represents a number of context topics. if rijk=doc represents a case of selecting a document topic. if rijk=con represents a case of selecting a context topic.

In such a manner, a parameter and the potential variable are calculated as shown in an expression (3) that follows.

$$\phi tv \propto c(\cdot,\cdot,t,v)+\beta$$

$$\theta it \propto c(i,\cdot,t,\cdot)+\alpha gl \text{ if } t\in doc$$

$$\theta ijt \propto c(i,j,t,\cdot)+\alpha loc \text{ if } t\in con \quad (3)$$

Here, $\theta tv$ is generation probability of a v-th characteristic amount element in a multinomial distribution of the topic t. $\theta it$ is probability that the i-th document generates a t-th document topic. $\theta ijt$ is probability that the j-th context of the i-th document generates the t-th context topic. if t∈doc represents a case that the topic is included in the document topics. if t∈con represents a case that the topic is included in the context topics.

For instance, using the characteristic amounts shown in FIG. 4 as an example, the parameter can be expected to learn as follows. Words such as "hip-hop" and "Missouri", which appear only in a specific document, tend to appear from the document topics, and words such as "born" and "rais" tend to appear from the context topics. Each potential variable thus estimated regarding each document and each context for learning is stored in the potential variable DB 15.

Regarding a document subjected to the analysis, by fixing the topic $\theta tv$, $\theta ijt$ and $\theta it$ may be estimated for a new characteristic amount.

[Description of Clustering Processor 16]

The clustering processor 16 clusters context information (proper noun pairs included therein) of a document subjected to the analysis utilizing the estimated potential variable. Specifically, since a context topic ratio $\theta con$ of each context shows information of the context, this context topic ratio $\theta con$ is considered as a new characteristic amount vector and the clustering is carried out based on this characteristic amount vector. Here, a clustering technique utilizing k-means or a clustering technique utilizing a mixture distribution is applied. However, it is also allowed to apply other clustering techniques. Although not directly related to the present embodiment, it can also be applied to classification.

By this clustering, it can be expected that, for example, the proper noun pair (Saint Joseph, Eminem) corresponding to the characteristic amount D1-1 and the proper noun pair (Paul McCartney, Liverpool) corresponding to the characteristic amount D2-1 shown in FIG. 4 are clustered in a same cluster.

[Description of Basic Information Generator 18]

The basic information generator 18 generates basic information based on the result of clustering retained in the analysis result DB 17. Specifically, for example, each word is counted that configures the characteristic amount of the context information (proper noun pair thereof) clustered in each cluster, and the most frequent word is made to be a name of the cluster and associated with the result of clustering the proper noun pair, thereby information as shown in FIG. 6 can be generated. The information can be utilized as, for example, metadata of the cluster name (in FIG. 6, Eminem).

[Description of Operations]

Next, a description is given to operations of the document analyzer 10 from analyzing the document subjected to the process until generating basic information thereof (hereinafter, referred to as a first basic information generation process).

Figure 7:
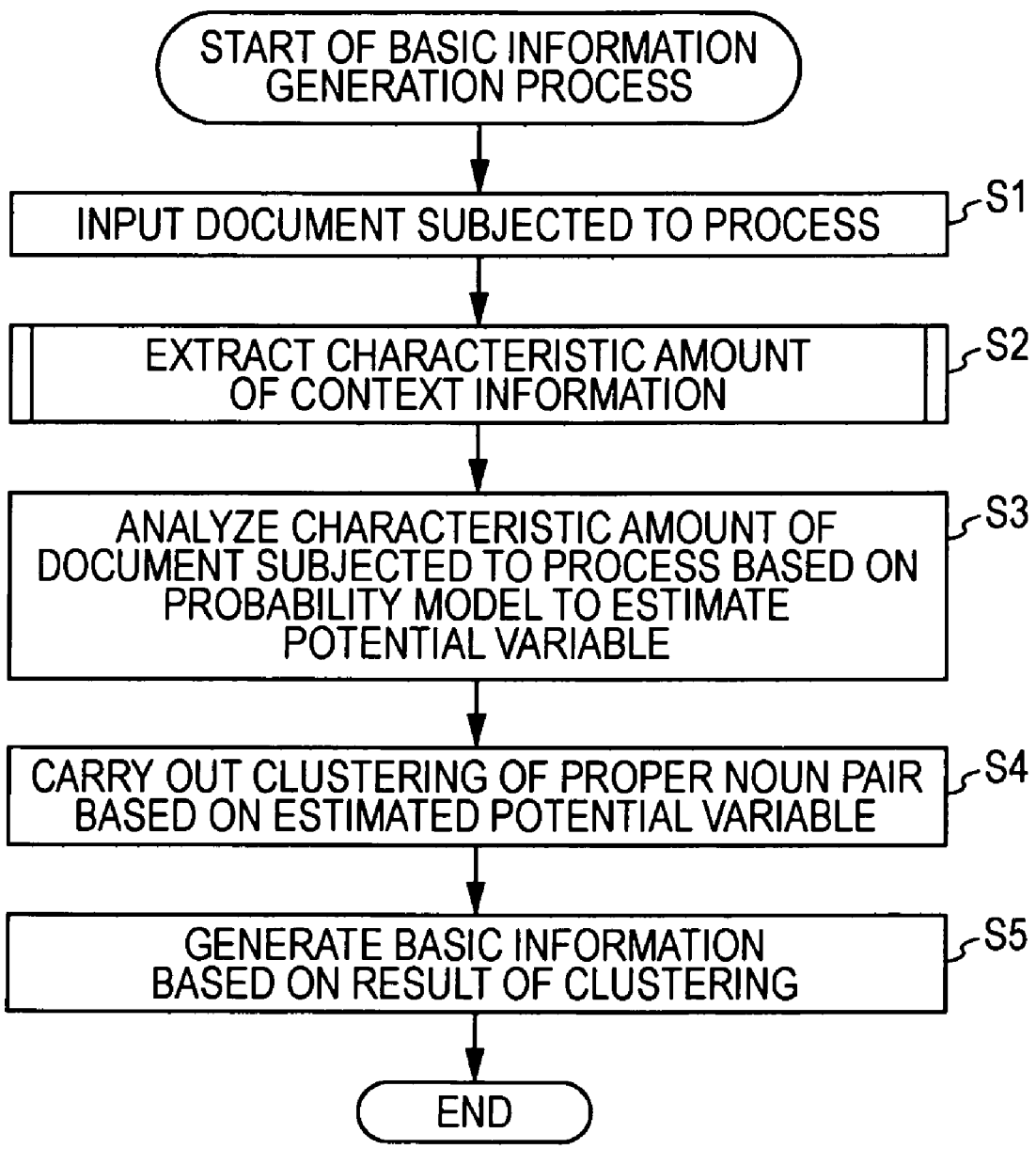
FIG. 7 is a flowchart explaining a first basic information generation process.

FIG. 7 is a flowchart explaining the first basic information generation process. As a prerequisite for the first basic information generation process, potential variables obtained by analyzing a large number of documents for learning are already retained in the potential variable DB 15.

In step S1, a document retained in the document DB 11 and subjected to the process is inputted to the characteristic amount extraction unit 12. In step S2, the characteristic amount extraction unit 12 extracts a characteristic amount for each item of the context information included in the document subjected to the process.

Figure 8:
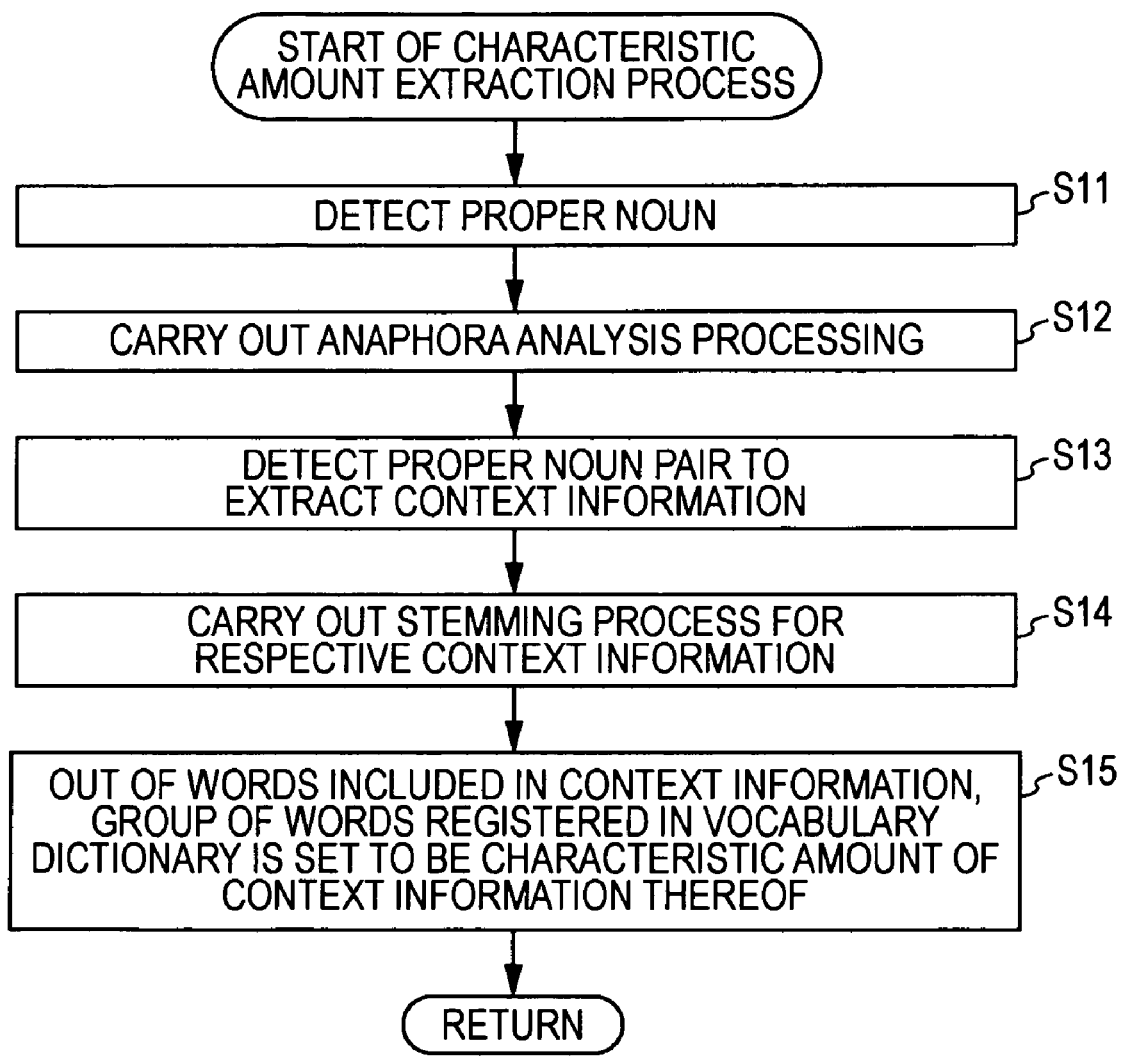
FIG. 8 is a flowchart explaining a characteristic amount extraction process.

FIG. 8 is a flowchart explaining the process of step S2 in detail.

In step S11, the proper noun extraction unit 21 detects proper nouns from the document subjected to the process. In step S12, the anaphora analyzing unit 22 carries out an anaphora analysis for the document subjected to the process.

In step S13, the context information extraction unit 23 extracts context information from the document subjected to the process. In step S14, the stemming processor 24 carries out a stemming process for each word that configures the respective context information extracted from the document subjected to the process. In step S15, the characteristic amount setting unit 25 sets characteristic amounts for the respective context information. The result of this is outputted to the characteristic amount DB 13, and the context information is associated with each document in the characteristic amount DB 13, and further, the characteristic amount is associated with the respective context information.

Back in FIG. 7, in step S3, the characteristic amount analyzing unit 14 estimates a potential variable corresponding to the characteristic amount of the respective context information of the document subjected to the process by Gibbs sampling shown in expression (2). It should be noted that the generation probability $\theta tv$ remains to be fixed.

In step S4, considering a context topic ratio $\theta con$ as a new characteristic amount vector of each context, the clustering processor 16 carries out clustering of the context information (proper noun pair thereof) based on the characteristic amount vector.

In step S5, the basic information generator 18 generates basic information based on the result of clustering retained in the analysis result DB 17. This is the end of the description of the first basic information generation process.

[Description of Other Operations]

Alternatively, an element in the characteristic amount may also be selected in the characteristic amount analyzing unit 14 utilizing the estimated potential variable to carry out clustering based on the selected characteristic amount in the clustering processor 16.

To select an element of the characteristic amount, a characteristic amount element tends to be generated from the context topics is selected based on the context topic ratio of the respective context information. Specifically, a sum of probability may be calculated in which each element in the characteristic amount is generated from the context topics in accordance with an expression (4) that follows.

$$p(w \mid con, \phi) = \sum_{z \in con} p(w \mid \phi, z) \qquad (4)$$

In expression (4), $p(w|\phi, z)$ indicates the part only related to a context topic. $\Sigma$ indicates calculation of a sum regarding all the context topics. Since a characteristic amount element having a large probability thereof tends to be generated from the context topics, it is considered to be useful as context information. Therefore, by selecting only the characteristic amount element(s) having the above probability of a predetermined threshold or greater and utilizing as a characteristic amount of the context information, only a characteristic amount depending on a local context can be utilized.

FIG. 9 is a flowchart explaining a second basic information generation process corresponding to a case of selecting an element in the characteristic amount utilizing the potential variable estimated in the characteristic amount analyzing unit 14.

As a prerequisite for the second basic information generation process, potential variables obtained by analyzing a large number of documents for learning are already retained in the potential variable DB 15.

In step S21, a document subjected to the process retained in the document DB 11 is inputted to the characteristic amount extraction unit 12. In step S22, the characteristic amount extraction unit 12 extracts a characteristic amount for each item of the context information included in the document subjected to the process.

In step S23, the characteristic amount analyzing unit 14 estimates a potential variable corresponding to the characteristic amount of the respective context information of the document subjected to the process by Gibbs sampling shown in expression (2). It should be noted that the topic $\theta tv$ remains to be fixed.

In step S24, the characteristic amount analyzing unit 14 selects an element in the characteristic amount utilizing the estimated potential variable.

In step S25, the clustering processor 16 carries out clustering of the context information (proper noun pair thereof) in a characteristic amount space where the selection is made.

In step S26, the basic information generator 18 generates basic information based on the result of clustering retained in the analysis result DB 17. This is the end of the description of the second basic information generation process.

As the second basic information generation process, when a characteristic amount element is selected that tends to be generated from the context topics based on the context topic ratio of the respective context information, by making this as pre-processing, it is possible to improve the accuracy of statistical natural language processing in the past utilizing the context information.

It can also be utilized, for example, for estimation of a modality analysis of a word as follows. In a modality analysis, affirmation/negation of a word is estimated in a bootstrap manner utilizing an assumption, "neighboring words tend to be in the same evaluation polarity with each other". In other words, a word to be a seed having an already recognized evaluation polarity is prepared, and when there is no paradoxical expression, such as however, the evaluation polarity of the word appearing in the context is made as the evaluation polarity of the word and is added to the seed. By utilizing only the words strongly relevant to the context as prospective words according to an embodiment of the present invention, only the words with which the above assumption is easily established can be subjected to the process.

As described above, according to the present embodiment, both the document topics and the context topics can be considered, and also only the part relevant to the context information can be considered when utilizing the topics only relevant to the context, so that it is possible to expect an improvement in the accuracy of language processing utilizing context information.

In addition, it can also be utilized as characteristic amount selection to use only the characteristic amounts that tend to appear from the context topics even without directly utilizing the context topics. By incorporating this as pre-processing for already constructed natural language processing, the accuracy can be improved.

Syntax analysis processing and the like can be executed at a less calculation cost in comparison to the past. It is thus preferred for statistical natural language processing that is desired to process a large amount of documents.

Alternatively, the series of processes described above can be executed by hardware and can also be executed by software. In a case of executing the series of processes by software, programs that configure the software are installed from a program storage medium to a computer incorporated in exclusive hardware or, for example, a general purpose personal computer that can execute various functions by installing various programs.

FIG. 10 is a block diagram illustrating a configuration example of hardware of a computer that executes the series of processes described above using programs.

In such a computer 100, a CPU (central processing unit) 101, a ROM (read only memory) 102, and a RAM (random access memory) 103 are connected to each other by a bus 104.

The bus 104 is further connected to an input/output interface 105. The input/output interface 105 is connected to an input unit 106 configured with a keyboard, a mouse, a microphone, and the like, an output unit 107 configured with a display, a speaker, and the like, a storage unit 108 configured with a hard disk, a non-volatile memory, and the like, a communication unit 109 configured with a network interface and the like, and a drive 110 that drives a removable medium 111, such as a magnetic disk, an optical disk, a magnetooptical disk, or a semiconductor memory.

In the computer 100 configured as above, the CPU 101 loads a program, for example, stored in the storage unit 108 via the input/output interface 105 and the bus 104 to the RAM 103 for execution, thereby carrying out the series of processes described above.

The program to be executed by the computer may be a program carrying out the processes in time series in order of the description in this specification and may also be a program carrying out the processes in parallel or at a desired timing, such as on-call.

In addition, the program may also be processed by one computer or may also be distributed processed by a plurality of computers. Further, the program may also be executed by being transferred to a remote computer.

Embodiments of the present invention are not limited to the embodiment described above, and various modifications can be made without departing from the spirit of the present invention.

What is claimed is:

1. An information processor carrying out statistical natural language processing for a document, the information processor comprising:
    characteristic amount extraction means for detecting context information including a proper noun pair from the document and extracting a characteristic amount of the detected context information;
    characteristic amount analysis means for, by analyzing the characteristic amount of the extracted context information using a probability model in which a document topic meaning an entire topic of the document and a context topic meaning a local topic of the document are considered, estimating a potential variable and a context topic ratio in the probability model; and
    clustering means for clustering the proper noun pair included in the context information based on the context topic ratio estimated regarding the characteristic amount of the respective context information,
    wherein the characteristic amount extraction means includes:
        detection means for detecting a proper noun in the document;
        anaphora analysis means for carrying out an anaphora analysis for the document;
        extraction means for setting the proper noun pair in the anaphora analyzed document and extracting the context information containing a plurality of words before and after the proper noun pair including the proper noun pair; and
        setting means for setting only a word that is registered in a vocabulary dictionary prepared in advance left from the extracted context information as the characteristic amount of the context information.

2. The information processor according to claim 1, further comprising
    basic information generation means for generating basic information corresponding to the context information based on a result of clustering the proper noun pair included in the context information.

3. The information processor according to claim 2, further comprising
    selection means for selecting an element in the characteristic amount based on the context topic ratio estimated regarding the characteristic amount of the respective context information.

4. The information processor according to claim 2, wherein the characteristic amount analysis means further estimates a mixing ratio of the document topic and the context topic by analyzing the characteristic amount of the extracted context information using the probability model.

5. The information processor according to claim 2, wherein the statistical natural language processing is a synonym analysis, a polysemic analysis, a relevance analysis between two nouns, or a modality analysis of a word.

6. A method of processing information of an information processor carrying out statistical natural language processing for a document that includes
    characteristic amount extraction means for detecting context information including a proper noun pair from the document and extracting a characteristic amount of the detected context information,
    characteristic amount analysis means for, by analyzing the characteristic amount of the extracted context information using a probability model in which a document topic meaning an entire topic of the document and a context topic meaning a local topic of the document are considered, estimating a potential variable and a context topic ratio in the probability model, and clustering means for clustering the proper noun pair included in the context information based on the context topic ratio estimated regarding the characteristic amount of the respective context information, the method comprising:

a first characteristic amount extracting step of detecting context information including a proper noun pair from a document for learning and extracting a characteristic amount of the detected context information by the characteristic amount extraction means;

a first characteristic amount analyzing step of, by analyzing the characteristic amount of the context information extracted from the document for learning using the probability model, estimating the potential variable in the probability model by the characteristic amount analysis means;

a second characteristic amount extracting step of detecting context information including a proper noun pair from a document for analysis and extracting a characteristic amount of the detected context information by the characteristic amount extraction means;

a second characteristic amount analyzing step of, by analyzing the characteristic amount of the context information extracted from the document for analysis using the probability model, estimating the context topic ratio in the probability model by the characteristic amount analysis means; and a clustering step of clustering the proper noun pair included in the context information based on the context topic ratio estimated regarding the characteristic amount of the respective context information by the clustering means.

7. A non-transitory computer-readable storage medium having stored thereon a program to cause a computer to perform a method of carrying out statistical natural language processing for a document, said method comprising:

detecting context information including a proper noun pair from the document and extracting a characteristic amount of the detected context information;

by analyzing the characteristic amount of the extracted context information using a probability model in which a document topic meaning an entire topic of the document and a context topic meaning a local topic of the document are considered, estimating a potential variable and a context topic ratio in the probability model; and clustering the proper noun pair included in the context information based on the context topic ratio estimated regarding the characteristic amount of the respective context information, wherein the detecting and extracting includes:
  detecting a proper noun in the document;
  carrying out an anaphora analysis for the document;
  setting the proper noun pair in the anaphora analyzed document and extracting the context information containing a plurality of words before and after the proper noun pair including the proper noun pair; and
  setting only a word that is registered in a vocabulary dictionary prepared in advance left from the extracted context information as the characteristic amount of the context information.

8. An information processor carrying out statistical natural language processing for a document, the information processor comprising:

a characteristic amount extraction unit configured to detect context information including a proper noun pair from the document and extract a characteristic amount of the detected context information;

a characteristic amount analysis unit configured to, by analyzing the characteristic amount of the extracted context information using a probability model in which a document topic meaning an entire topic of the document and a context topic meaning a local topic of the document are considered, estimate a potential variable and a context topic ratio in the probability model; and a clustering unit configured to cluster the proper noun pair included in the context information based on the context topic ratio estimated regarding the characteristic amount of the respective context information, wherein the characteristic amount extraction unit includes:
  a detection unit to detect a proper noun in the document;
  an anaphora analysis unit to carry out an anaphora analysis for the document;
  an extraction unit to set the proper noun pair in the anaphora analyzed document and extract the context information containing a plurality of words before and after the proper noun pair including the proper noun pair; and
  a setting unit to set only a word that is registered in a vocabulary dictionary prepared in advance left from the extracted context information as the characteristic amount of the context information.

* * * * *